Figure 1:
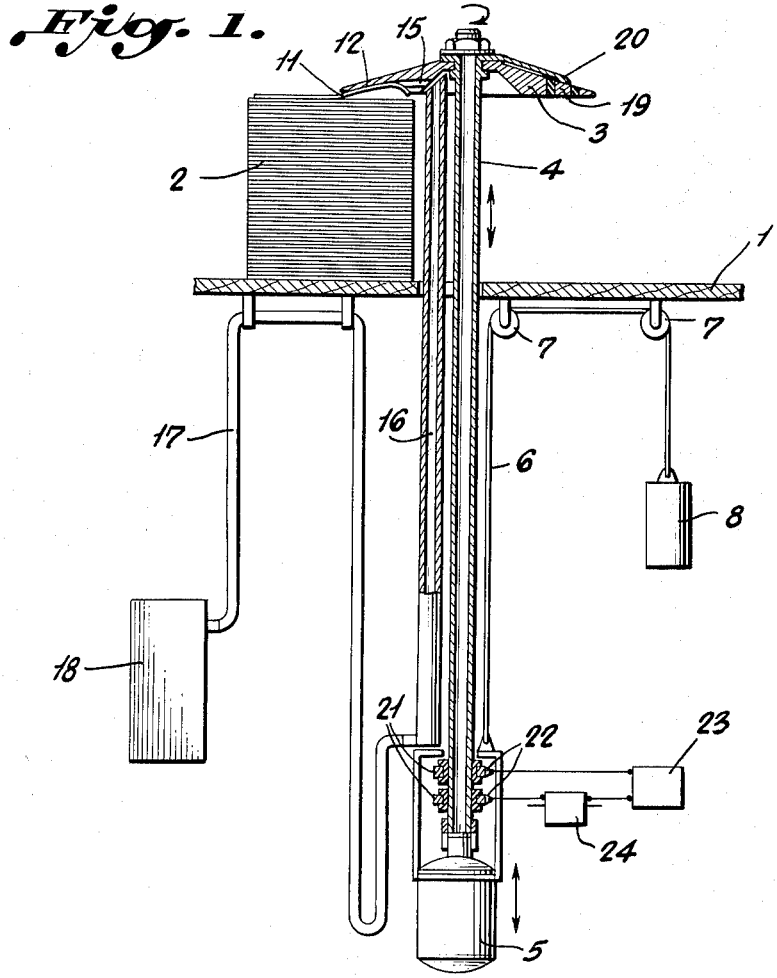

Jan. 25, 1966 V. A. OLEINIK 3,231,264
SHEET SEPARATING AND HANDLING APPARATUS
Filed Feb. 27, 1961 4 Sheets-Sheet 1

INVENTOR
V. A. OLEINIK

BY Glascock, Downing & Seebold
ATTORNEYS

Jan. 25, 1966 V. A. OLEINIK 3,231,264
SHEET SEPARATING AND HANDLING APPARATUS
Filed Feb. 27, 1961 4 Sheets-Sheet 2
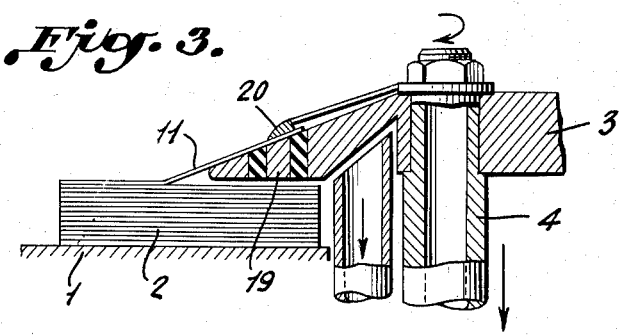
Fig. 3.
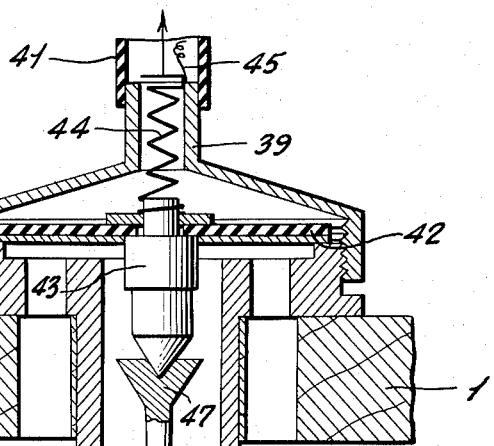
Fig. 8.
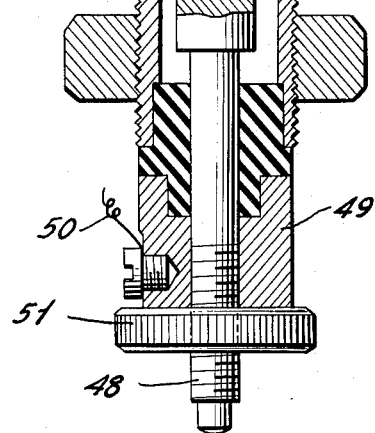
INVENTOR
V. A. OLEINIK
BY *Glascock, Downing & Seebold*
ATTORNEYS

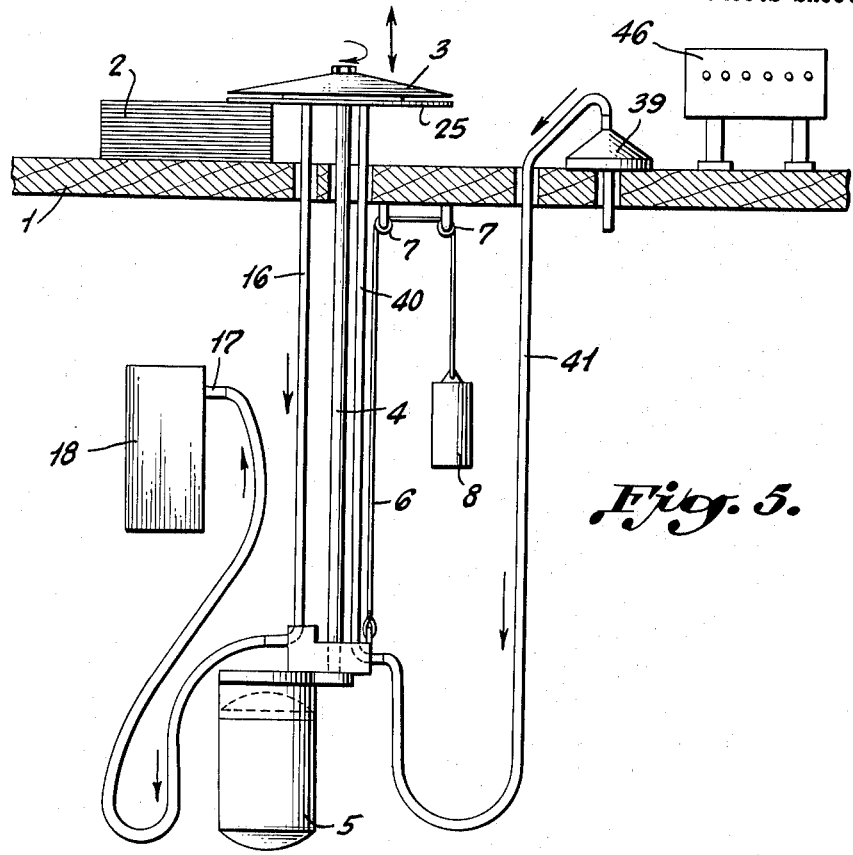
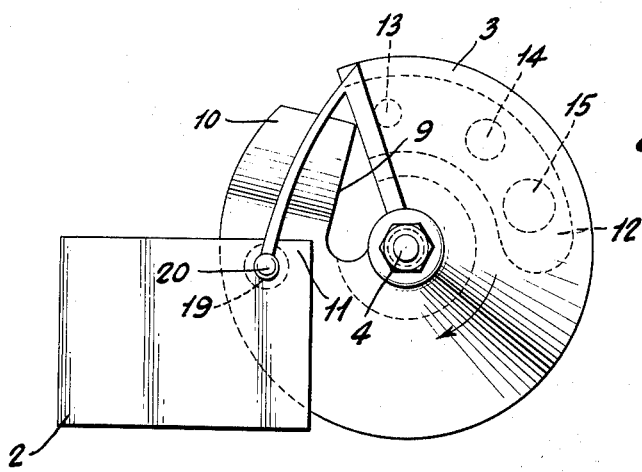

Jan. 25, 1966  V. A. OLEINIK  3,231,264
SHEET SEPARATING AND HANDLING APPARATUS
Filed Feb. 27, 1961  4 Sheets-Sheet 4

INVENTOR
V. A. OLEINIK

BY Glascock, Downing & Seebold
ATTORNEYS

United States Patent Office 3,231,264
Patented Jan. 25, 1966

3,231,264
SHEET SEPARATING AND HANDLING APPARATUS
Vasily Avksentievich Oleinik, Moscow, U.S.S.R., assignor to Moscovskaya pechatnaya fabrica Goznak, Moscow, U.S.S.R.
Filed Feb. 27, 1961, Ser. No. 94,961
8 Claims. (Cl. 271—11)

The present invention relates to a sheet separating and handling apparatus which may be connected to a counter for determining the number of sheets in a packet, as for example, a packet of money.

The existing counting apparatus for determining the number of sheets in a packet are of a complex design, and, are somewhat unreliable as well as rather slow in operation.

The object of the present invention is to create an effective and reliable sheet handling apparatus which is comparatively simple in design.

The object of this invention is to also increase the rate at which sheets may be handled and consequently counted.

The sheet handling apparatus, which is described below, differs from other known computer apparatus of a similar nature in that a rotating conical disc, which separates the upper sheet from the top of a pile, is furnished with a spherically-shaped indentation with openings which come into regular communication with a vacuum pump during rotation of the disc.

A description is also included of a modification of the sheet handling apparatus, the main feature of which is an auxiliary flat disc provided beneath a conical disc with a space between them for passage of the sheet. A radial cut is made forming a protuberance with which to seize the sheet. The protuberance is located under the spherical indentation of the conical disc and the latter is equipped on its underside, opposite the cut on the lower disc, with another spherical cut with a suction cup, while the protuberance of the lower disc is equipped with a suction cup opening in the upper side connected to the vacuum system.

Another feature of the modified sheet handling apparatus herein described is that the upper surface of the protuberance of the conical disc is provided with two openings connected with each other through grooves and covered by the sheet being handled. One of the openings is connected with the vacuum system at regular intervals, while the second is connected with a diaphragm chamber, through which the contacts in a counter control circuit are opened and closed.

Figure 2:
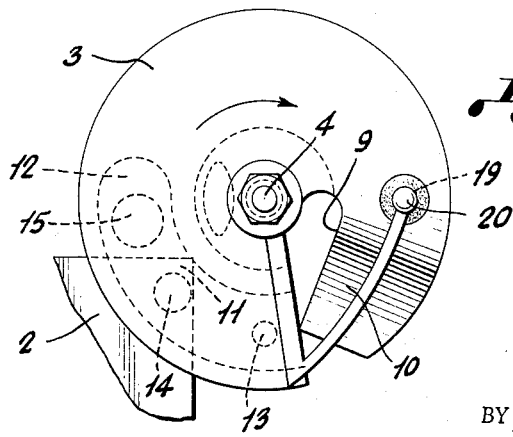
Figure 6:
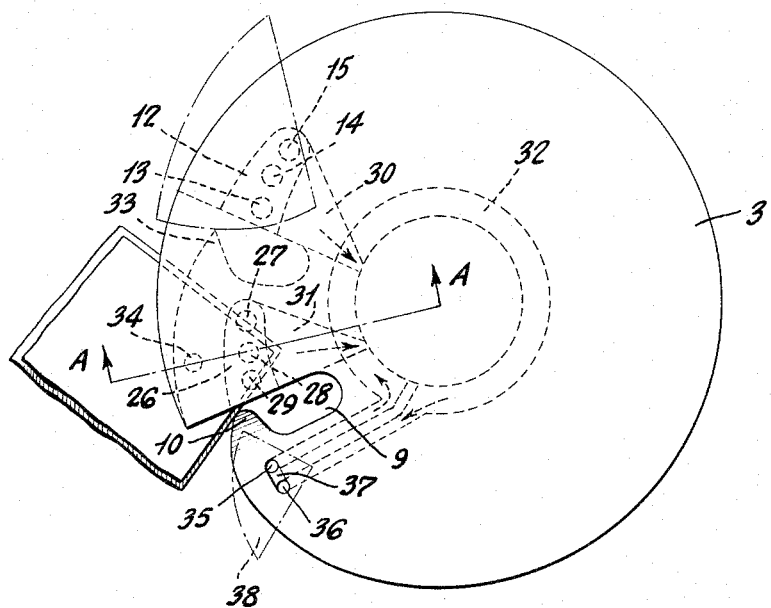
Figure 7:
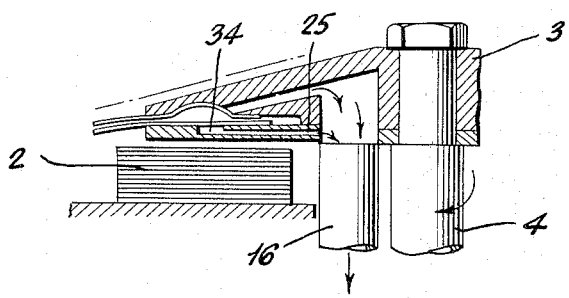

Further objects and advantages of the invention will be apparent from the following description taken in conjunction with the accompanying drawings wherein:

FIG. 1 is a longitudinal sectional view showing a sheet handling apparatus constructed in accordance with this invention;

FIG. 2 a plan view of the conical sheet engaging disc;

FIG. 3 a fragmentary longitudinal sectional view showing the conical sheet engaging disc and the manner of transferring a sheet from below the disc to the upper surface thereof;

FIG. 4 a plan view of the apparatus shown in FIG. 3;

FIG. 5 an elevational view showing a modified form of sheet handling apparatus;

FIG. 6 a plan view showing the sheet engaging disc of the modified apparatus of FIG. 5;

FIG. 7 a sectional view taken substantially on the line A—A of FIG. 6; and

FIG. 8 a longitudinal sectional view showing the diaphragm chamber and vacuum operated switch.

The sheet handling apparatus for facilitating the determination of the number of sheets in a packet consists of a table onto which are set the packets to be counted, a conical disc with a cut section and electrical contacts, a pneumatic system, an electronic counter and drive system.

Stationary table 1 serves as a support for packet 2, the number of sheets of which it is necessary to determine. Conical disc 3, fastened to shaft 4, is movable in relation to the table in a vertical direction. The shaft passing through an opening in the table and driven by electric motor 5, rotates at a uniform rate in the direction of arrow A. The whole system is suspended from cable 6 which passes over pulley-block 7 and which is provided with counter-balance 8.

Radial cut 9, in the conical disc, forms a finger 10 having an inclined upper surface which engages and serves to raise the corner of sheet (next in turn) 11 to be separated from packet 2. The conical disc is also provided on its under side with indentation or recess 12 with vacuum cups or ports 13, 14, and 15. During rotation of the disc, the vacuum cups or ports, at regular intervals, communicate with vacuum pump 18 via pipe 16 and hose 17.

Insulated electrical contact 19 and brush 20, through which a counter control circuit is closed, are located on finger 10 of the conical disc; they are connected by wires (not shown) with rings 21, set on insulated washers on shaft 4. The rings come into contact with brushes 22 which are electrically connected with electronic counter 23 and power supply 24.

The apparatus for the determination of the number of sheets in a packet operates in the following manner: with the aid of a lever (not shown in the diagram) conical disc 3 is raised to its extreme upper position, after which packet 2, with the sheets which it is necessary to count, is set on table 1. After the packet has been put in place, the lever is released and the disc moves downwardly into contact with the upper surface of the packet. With the disc 3 rotating in the direction of arrow A, suction cups 13, 14, and 15 are connected one after another with vacuum-pump 18 and a corner of the upper sheet 11 of the packet is drawn up; the mentioned corner protrudes and is slightly raised from the packet. Upon further rotation of the disc 3, finger 10 enters between sheet 11 and packet 2, causing the corner of the sheet to slip between contact 19 and brush 20 to open the control circuit as shown in FIG. 3. Upon further rotation of the disc 3, the corner passes out from under the brush 20, as a result of which the counter control circuit is closed and a corresponding impulse is transmitted to electronic counter 23, by which means the sheets are counted.

At the next revolution of the conical disc 3, the second sheet (next in turn) of the packet is separated and an impulse is transmitted to the electronic counter in the same manner as above described. As the sheets are gathered on the upper surface of the disc, the disc slowly moves down; thus the number of sheets in the whole packet is determined.

The major difference in the modified sheet handling apparatus shown in FIGS. 5–8, is the presence of the additional flat disc 25 located under conical disc 3 with the same axis as the latter on vertical shaft 4. In addition to indentation or recess 12 with suction cups 13, 14, and 15, the conical disc is also provided with a second arcuate groove 26 with suction cups 27, 28, and 29. Recess 12 and groove 26 are connected via canals 30 and 31 with circular channel 32 which is connected through pipe 16 and hose 17 with vacuum pump 18. A finger 33 on the flat disc 25 is located in front of and below the groove 26 of the conical disc. In the upper part of finger 33 is located suction opening 34, and also openings 35 and 36, which are connected with each other via canal 37 covered by sheet 38 being counted. Opening 35 is regularly connected with the vacuum system, and opening 36 with diaphragm chamber 39, through pipe 40 and hose 41 as shown in FIG. 8. Inside the diaphragm chamber 39 is disposed an elastic rubber diaphragm 42, to which is secured an electrical contact 43, which, in turn, is connected to connector spring 44 and wire 45, the latter being connected to the power supply circuit of electronic counter 46 (FIG. 4). A second contact consists of brush 47 mounted on an insulation washer and brush 47 may be adjusted to the necessary position by screw 48 threaded into plug 49 which is connected with the electronic counter power supply via wire 50. Brush 47 may be secured in adjusted position by lock nut 51.

At speeds from two to ten thousand sheets per minute, hose 41 may be connected to a cell containing a suitable microphone which serves to provide an impulse for each sheet, which covers openings 35 and 36 and canal 37.

The modified apparatus works in the following manner. The position of the packet in relation to the discs at the moment prior to the upper sheet being engaged is shown in FIG. 6 as a dotted line formed by a series of two dots. When the discs rotate, suction cups 13, 14, and 15 in the upper conical disc draw the uppermost sheet towards the canal in the lower disc. At this point, the corner of the sheet is separated from the packet and is directed over finger 33 of the lower disc to the opening between the lower and conical discs. Then, suction cups 27, 28, and 29 raise the sheet, directing it over finger 10 of the conical disc. If, by mistake, two sheets are seized at the same time, suction opening 34 on the upper surface of the finger 33 of the lower disc separates the second sheet from the upper sheet taken by error (as shown in FIG. 7), and prevents engagement with finger 10 of the upper disc. This sheet is redirected to the opening between the discs.

During the second rotation of the discs, if two sheets have been seized, the lower sheet, taken by mistake, covers suction cups 13, 14, and 15 of the upper disc and prevents the next-in-turn sheet to be drawn from the packet until the sheet taken by error has been brought over finger 10 of the conical disc.

The sheet pasing over the finger 10 covers the partly open canal 37, connecting openings 35 and 36. As a result, diaphragm chamber 39 is connected to the vacuum system.

Under force of the vacuum diaphragm 42 rises, thus opening contacts 43 and 47 in the supply circuit of impulse electronic counter 46.

The counter then makes count of the next sheet.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A sheet separating and handling apparatus for use with an electronic counter, said apparatus comprising a table for receiving a stack of sheets, a vertically movable rotatable shaft projecting upwardly through said table, counter-balancing means for said shaft, means for driving said shaft, a disc fixed to the upper end of said shaft and having a conical upper surface, said disc adapted to overlie a stack of sheets disposed on said table, a generally radial notch in said disc serving to provide a sheet engaging finger having an inclined upper surface, an arcuate recess in the lower surface of said disc on the side of said notch opposite said finger, ports in said disc communicating with said recess, a source of vacuum, means operative upon rotation of said disc to provide intermittent communication between said ports and said source, an electrical contact on the upper surface of said finger in the path of movement of a sheet engaging the upper surface of said finger, an electrical contact brush normally engaging said first mentioned contact and means for connecting said contact and brush to an electrical circuit of said counter, whereby upon rotation of said disc in close proximity to the upper surface of the corner of a stack of sheets, the corner of the uppermost sheet will be moved upwardly in response to application of a vacuum to said recess and into engagement with the upper surface of said finger and pass said corner between said contact and said brush to interrupt the electrical circuit to control the operation of said counter, said shaft and disc moving downwardly and engaging successive sheets as said disc continues to rotate.

2. An apparatus as defined in claim 1, in which the means for connecting said contact and brush to an electrical circuit comprises slip rings mounted on said shaft and brushes engaging said slip rings, said brushes being connected to said counter.

3. A sheet separating and handling apparatus for use with an electronic counter, said apparatus comprising a table for receiving a stack of sheets, a vertically movable rotatable shaft projecting upwardly through said table, means for driving said shaft, a disc fixed to the upper end of said shaft and having a conical upper surface, said disc adapted to overlie a stack of sheets disposed on said table, a notch in said disc serving to provide a sheet engaging finger having an inclined upper surface, a recess in the lower surface of said disc on the side of said notch opposite said finger, ports in said disc communicating with said recess, a source of vacuum, means operative upon rotation of said disc to provide intermittent communication between said ports and said source, an electrical contact on the upper surface of said finger in the path of movement of a sheet engaging the upper surface of said finger, an electrical contact brush normally engaging said first mentioned contact and means for connecting said contact and brush to an electrical circuit of said counter, whereby upon rotation of said disc in close proximity to the upper surface of the corner of a stack of sheets, the corner of the uppermost sheet will be moved upwardly in response to the application of a vacuum to said recess and into engagement with the upper surface of said finger and pass said corner between said contact and said brush to interrupt the electrical circuit to control the operation of said counter, said shaft and disc moving downwardly and engaging successive sheets as said disc continues to rotate.

4. A sheet separating and handling apparatus for use with an electronic counter, said apparatus comprising a table for receiving a stack of sheets, a vertically movable rotatable shaft projecting upwardly through said table, counter-balancing means for said shaft, means for driving said shaft, a disc fixed to the upper end of said shaft and having a conical upper surface, a flat disc fixed to said shaft below said conical disc, said discs adapted to overlie a stack of sheets disposed on said table, a generally radial notch in said flat disc serving to provide a sheet engaging finger having an inclined upper surface, an arcuate groove in the lower surface of said flat disc on the side of said notch opposite said finger, ports in said flat disc communicating with said groove, a generally radial notch in said conical disc serving to provide a second sheet engaging finger having an inclined upper surface, an arcuate recess in the lower surface of said conical disc on the side of said last named notch opposite said second finger, ports in said conical disc communicating with said groove, a source of vacuum, means operative upon rotation of said disc to provide intermittent communication between said ports and said source, a channel in the upper surface of said second finger, means providing communication between said channel and said source, vacuum operated electrical control means for said counter and means connecting said channel and said control means, whereby upon rotation of said disc in close proximity to the upper surface of the corner of a stack of sheets, the corner of the uppermost sheet will be moved upwardly in response to the application of the vacuum to said groove and into engagement with the upper surface of said first finger, the application of a vacuum to said recess serving to move said corner upwardly and into engagement with the upper surface of said second finger, said corner moving over said channel to close the same and apply a vacuum to said control means to control the operation of said counter, said discs moving downwardly and engaging successive sheets as said discs continue to rotate.

5. An apparatus as defined in claim 4, in which said control means comprises a vacuum operated switch.

6. An apparatus as defined in claim 4, in which said control means comprises a microphone.

7. A sheet separating and handling apparatus for use with an electronic counter, said apparatus comprising a table for receiving a stack of sheets, a vertically movable rotatable shaft projecting upwardly through said table, means for driving said shaft, a disc fixed to the upper end of said shaft and having a conical upper surface, a flat disc fixed to said shaft below said conical disc, said disc adapted to overlie a stack of sheets disposed on said table, a generally radial notch in said flat disc serving to provide a sheet engaging finger having an inclined upper surface, an arcuate groove in the lower surface of said flat disc on the side of said notch opposite said finger, ports in said flat disc communicating with said groove, a generally radial notch in said conical disc serving to provide a second sheet engaging finger having an inclined upper surface, an arcuate recess in the lower surface of said conical disc on the side of said last named notch opposite said second finger, ports in said conical disc communicating with said groove, a source of vacuum, means operative upon rotation of said disc to provide intermittent communication between said ports and said source, a channel in the upper surface of said second finger, means providing communication between said channel and said source, vacuum operated electrical control means for said counter and means connecting said channel and said control means, whereby upon rotation of said disc in close proximity to the upper surface of the corner of the stack of sheets, the corner of the uppermost sheet will be moved upwardly in response to application of a vacuum to said groove and into engagement with the upper surface of said first finger, the application of a vacuum to said recess serving to move said corner upwardly and into engagement with the upper surface of said second finger, said corner moving over said channel to close the same and apply a vacuum to said control means to control the operation of said counter, said discs moving downwardly and engaging successive sheets as said discs continue to rotate.

8. A sheet separating and handling apparatus for use with an electronic counter, said apparatus comprising a table for receiving a stack of sheets, a vertically movable rotatable shaft projecting upwardly through said table, means for driving said shaft, a disc fixed to the upper end of said shaft and having a conical upper surface, a flat disc fixed to said shaft below said conical disc, said disc adapted to overlie a stack of sheets disposed on said table, a notch in said flat disc serving to provide a sheet engaging finger having an inclined upper surface, a groove in the lower surface of said flat disc on the side of said notch opposite said finger, ports in said flat disc communicating with said groove, a notch in said conical disc serving to provide a second sheet engaging finger having an inclined upper surface, a recess in the lower surface of said conical disc on the side of said last named notch opposite said second finger, ports in said conical disc communicating with said groove, a source of vacuum, means operative upon rotation of said disc to provide intermittent communication between said ports and said source, a channel in the upper surface of said second finger, means providing communication between said channel and said source, vacuum operated electrical control means for said counter and means connecting said channel and said control means, whereby upon rotation of said discs in close proximity to the upper surface of the corner of a stack of sheets, the corner of the uppermost sheet will be moved upwardly in response to application of a vacuum to said groove and into engagement with the upper surface of said first finger, the application of a vacuum to said recess serving to move said corner upwardly and into engagement with the upper surface of said second finger, said corner moving over said channel to close the same and apply a vacuum to said control means to control the operation of said counter, said discs moving downwardly and engaging successive sheets as said discs continue to rotate.

References Cited by the Examiner

UNITED STATES PATENTS

| | | | |
|---|---|---|---|
| 1,619,711 | 3/1927 | Engstrom | 271—29 |
| 1,715,993 | 6/1929 | Cummings | 271—5 |
| 2,004,835 | 6/1935 | Schneider | 235—92.1 |
| 2,274,590 | 2/1942 | Cook | 271—5 |
| 2,294,273 | 8/1942 | Buxbaum | 271—5 |
| 2,810,575 | 10/1957 | Holmen | 271—27 |

M. HENSON WOOD, Jr., *Primary Examiner.*

CORNELIUS D. ANGEL, RAPHAEL M. LUPO, ROBERT B. REEVES, *Examiners.*